US006197189B1

(12) United States Patent
Schwartz et al.

(10) Patent No.: US 6,197,189 B1
(45) Date of Patent: *Mar. 6, 2001

(54) OXYGENATED WATER COOLER

(75) Inventors: Henry Schwartz, Kings Point; Dennis E. Crowley, Adams; Jason Ritton, Schenevus; George P. Mravlja, Jr., Worcester; R. Glenn Wright, East Aurora; Doug Mowers, Worcester, all of NY (US)

(73) Assignee: Oxygen8, Inc., Jamaica, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,799

(22) Filed: Oct. 28, 1998

Related U.S. Application Data

(63) Continuation-in-part of application No. 08/878,609, filed on Jun. 19, 1997, now Pat. No. 5,868,944.

(51) Int. Cl.$^7$ ........................................................ C02F 1/72
(52) U.S. Cl. .................... 210/192; 210/198.1; 222/146.6
(58) Field of Search ................................. 210/192, 198.1; 222/146.6

(56) References Cited

U.S. PATENT DOCUMENTS

| 4,219,424 | 8/1980 | Tamura et al. . |
| 4,765,807 | 8/1988 | Henriksen . |
| 5,006,352 | 4/1991 | Zelenak nee Zoltai et al. . |
| 5,295,519 | 3/1994 | Baker et al. . |
| 5,540,355 | 7/1996 | Hancock et al. . |
| 5,647,416 | 7/1997 | Desrosiers et al. . |
| 5,699,669 | 12/1997 | Gebhard . |
| 6,017,447 | * 1/2000 | Wright et al. ........................ 210/192 |

FOREIGN PATENT DOCUMENTS

WO 95/29130   11/1995   (WO) .

* cited by examiner

Primary Examiner—Duane Smith
Assistant Examiner—Betsey Morrison Hoey
(74) Attorney, Agent, or Firm—Schmeiser, Olsen & Watts

(57) ABSTRACT

An oxygenated water cooler and method of operating the same for dispensing oxygen enriched water from a bottle installed on the cooler. An oxygen source integrated into the cooler delivers oxygen through the water to a headspace above the water in the bottle to maintain the dissolved oxygen content of water in the bottle at a supersaturated level throughout the usage cycle of the bottle.

24 Claims, 8 Drawing Sheets

OXYGENATED WATER COOLER

The present patent application is a continuation-in-part of U.S. patent application Ser. No: 08/878,609, filed Jun. 19, 1997, and entitled "Oxygenated Water Cooler," now U.S. Pat. No. 5,868,944, issued Feb. 9, 1999. The present patent application is related to copending U.S. patent application Ser. No: 09/181,415, filed concurrently herewith, and entitled "Water Bottle Cap."

BACKGROUND OF THE INVENTION

The present invention relates to the art of coolers for dispensing fluids such as drinking water, and more particularly to a new and improved water cooler for dispensing oxygen enriched water.

Oxygen enriched drinking water has an enhanced taste appeal and offers the health and fitness conscious consumer an alternative and supplemental source of oxygen that is absorbed through the stomach. The term drinking water is intended to include, without limitation, spring water, filtered water, or water treated by the reverse osmosis process.

The dissolved oxygen content of natural pure spring water ranges from between about 5 mg/liter to 9 mg/liter depending on the source of the water, purification and processing techniques applied prior to bottling, and other factors. The water can be supersaturated with oxygen by injecting molecular oxygen into a water pipeline controlled at a pressure of 40–90 PSIG (pounds per square inch gage), or using other known methods. Using this technique, the dissolved oxygen level of the water can be increased to about 25–125 mg/liter. If bottled immediately in hermetically sealed bulk glass bottles or other suitable containers, the water will maintain the elevated dissolved oxygen level indefinitely.

Bulk water bottles typically are in the 3–5 gallon range. Upon opening a bulk water bottle containing water that is supersaturated with oxygen, and installing the water bottle on a standard water cooler, the dissolved oxygen in the water decreases to near the baseline level of about 5–9 mg/liter within about 3–5 days. Since the average time required to consume a 3–5 gallon bulk water bottle typically is in the 10–14 day range, the rapid decrease in dissolved oxygen prevents the commercial marketing of oxygen enriched drinking water in 3–5 gallon bulk bottles for use on standard water coolers.

It would, therefore, be highly desirable to provide a new and improved water cooler for dispensing oxygen enriched water wherein the dissolved oxygen content of water in the bottle installed on the water cooler is maintained at or about the original supersaturated level during the entire time water is dispensed from the bottle by the cooler, i.e., during the entire usage cycle of the bottle.

SUMMARY OF THE INVENTION

The present invention provides a new and improved water cooler and method of operating the same for dispensing oxygen enriched water from a water bottle installed on the cooler, the water having a dissolved oxygen content at a supersaturated level previously established during bottling of the water. An oxygen source combined with the water cooler delivers oxygen through the water to a headspace in the bottle above the water to maintain the dissolved oxygen content of water in the bottle substantially at the supersaturated level during the entire time water is dispensed from the bottle by the cooler. The oxygen source preferably comprises an oxygen generator, and such generator preferably comprises a pressure swing adsorption oxygen generating apparatus. Alternatively, the oxygen source can be of various other forms including stored oxygen such as bottled oxygen.

Other features are included in the oxygenated water cooler to improve the operation and functionality of the water cooler. For example, the water cooler of the present invention may include a control system including, for example, a timer and control solenoid for cyclically purging a sieve in the oxygen generator to increase the oxygen purity level within the water bottle.

Another embodiment of the present invention includes a water tank lid with increased strength and sealing capabilities. In the water cooler of the present invention, the water tank lid must contain the pressure of the oxygen introduced into the water tank, and must also prevent the water from leaking from the water tank. Accordingly, a mounting adapter assembly is provided to attach the water tank lid to a bottle entry portion of the water cooler. For increased strength and sealing, the mounting adapter assembly is attached with screws, bolts, or other suitable mounting hardware to the water tank lid and is sealed with flexible sealing material to prevent leakage of oxygen and water from the water tank.

Another embodiment of the present invention includes a muffler apparatus for reducing the noise produced by the sieve exhaust venting port of the oxygen generator.

Another embodiment of the present invention includes a water dispenser control unit that provides metered amounts of water in response to the insertion of coins, bills, tokens, or other forms of currency. A credit card, ATM card, debit card, or the like may also be used. The water dispenser control unit provides a convenient way for people to pay for a cup of oxygenated water.

The water cooler of the present invention may additionally be configured to provide gaseous oxygen for direct inhalation. The oxygen is preferably supplied using a face mask apparatus connected to the oxygen generator of the water cooler, a tank of oxygen, or other oxygen source. An oxygen dispenser control unit that provides metered amounts of oxygen in response to user payment may also be provided.

Another embodiment of the present invention includes an apparatus for measuring the oxygen level of the oxygenated water in the water cooler. A meter may be mounted on the exterior of the water cooler or other visible location to provide a reading of the oxygen level of the water. The meter preferably displays a value corresponding to the ratio of oxygen contained in the oxygenated water relative to the oxygen level of water that has not been oxygenated. For example, this meter would read 550% if the oxygen level in the water bottle is 5.5 times the level of unoxygenated water.

The foregoing and additional advantages and characterizing features of the present invention will become clearly apparent upon a reading of the ensuing detailed description together with the included drawings wherein:

DETAILED DESCRIPTION OF THE INVENTION

The oxygenated water cooler according to the present invention includes an apparatus which preferably maintains the headspace in an inverted water bottle installed on the cooler at about 80–95% pure oxygen. The bottle typically is a five gallon bottle, but three gallon or smaller size bottles can be employed. The purpose of the oxygen rich headspace is to maintain the dissolved oxygen concentration of the bottled water at about 25–125 mg/liter. The water in the water bottle previously has been supersaturated with oxygen at a water purification and bottling plant or other source immediately prior to filling into the bottles. Testing has proved that the dispensing of oxygen enriched water in standard water coolers results in a rapid decline in the dissolved oxygen content of the water contained in the bottle. For example, within 3–5 days the dissolved oxygen levels dropped from 25–65 mg/liter to 10–13 mg/liter when 5 gallon bottles of oxygen enriched water were installed on a water cooler of standard, prior art design.

Figure 1:
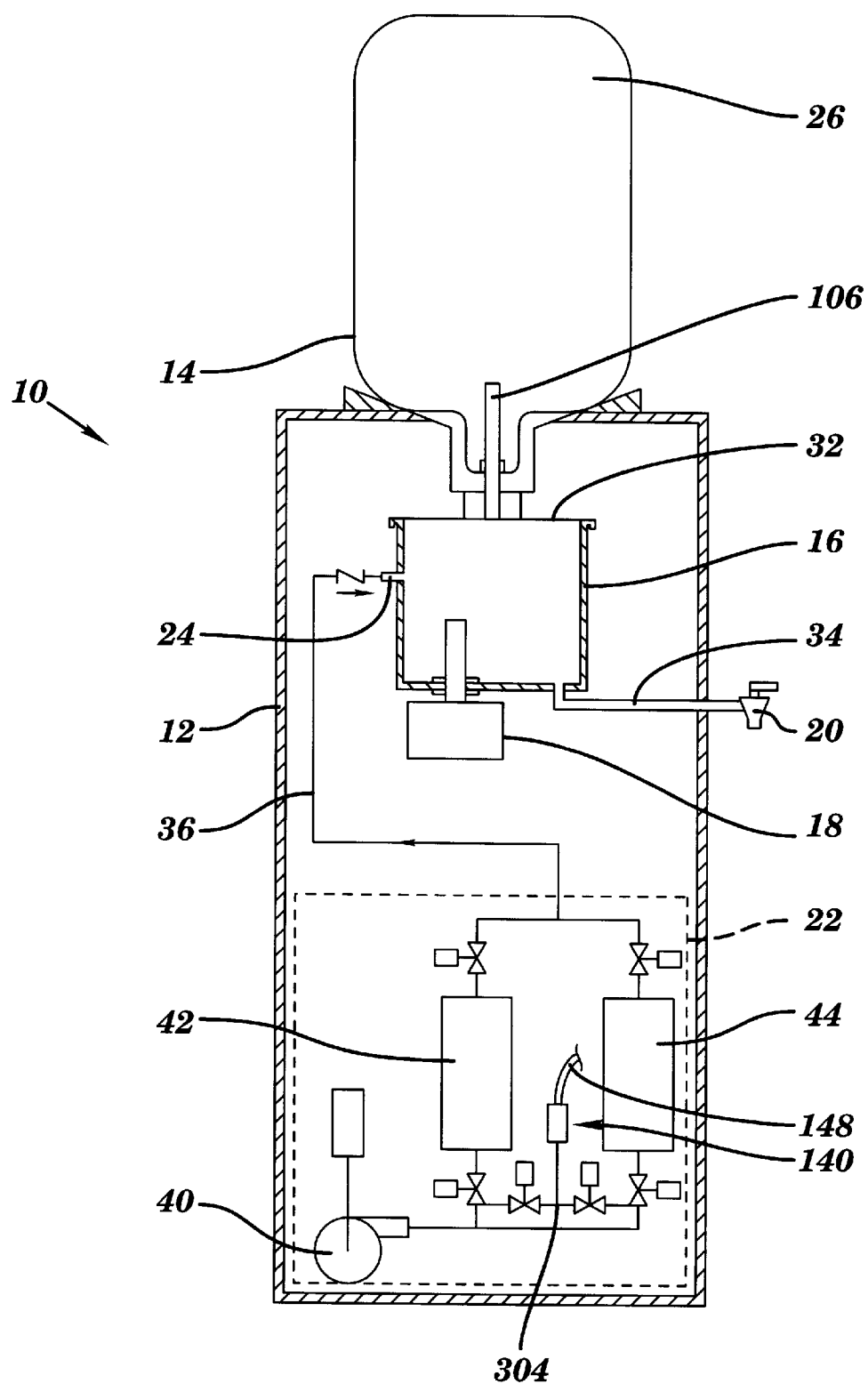
FIG. 1 is a diagrammatic view of an oxygenated water cooler in accordance with a first embodiment of the present invention.

The oxygenated water cooler 10 according to a first embodiment of the present invention is shown in FIG. 1 and includes, briefly, a housing or enclosure 12 for receiving a water bottle 14 which is inverted and installed on housing 12, a water tank 16 within the housing 12 for receiving water from the bottle 14, a refrigeration source 18 for cooling water in the tank 16, a spigot 20 for dispensing water from the tank 16, an oxygen source 22 preferably in the form of an on-board oxygen generator within the housing 12 and means 24 for introducing oxygen from the oxygen source 22 through the water in the bottle 14 to a void or headspace 26 within the bottle 14 above the water therein. As further illustrated in FIG. 8, the oxygen source 22 may alternately be enclosed within a housing 13 formed separately from the housing 12.

Considering the apparatus of FIG. 1 in more detail, the housing 12 preferably is of molded fiberglass construction but ultimately can be of other materials such as wood or metal. The water bottle 14 is installed in the cooler 10 by being placed in an inverted position on top of the cooler housing 12. The bottle cap (not shown) is pushed open and seals around a feed probe 106 which is attached to the top of the water tank 16. The water tank 16 is preferably constructed of stainless steel and has a cylindrical two piece design. The water tank lid 32 is removable to allow for cleaning and maintenance. A food grade gasket (not shown) seals the water tank lid 32 lid to the top of the water tank 16. The water tank lid 32 is held firmly fixed to the tank body with four locking clamps (not shown). The water tank includes a tubing connection 24 (e.g., ⅛" tubing) in the sidewall for the supply of oxygen and a water outlet pipe connection 34 in the bottom. Alternatively, the tubing connection 24 can be located in the water tank lid 32. The water outlet pipe connection 34 is piped directly to the spigot 20. In this manner, the water bottle 14, transfer tube 30, and water tank 16 form a single vessel that is pressurized at about 1–2 PSIG with about 80–95% pure oxygen supplied to the tubing connection 24 via conduit 36 from the oxygen source 22. As the oxygenated water is drawn from the water bottle 14 through the spigot 20, make-up oxygen flows into the water tank 16 and to headspace 26 of the water bottle 14 from the oxygen source 22, thereby maintaining a positive pressure within the water bottle 14. The oxygenated water in water tank 16 and water bottle 14 thus serves as a conduit for transferring oxygen from the oxygen source 22 to the headspace 26 of the water bottle 14.

Figure 8:
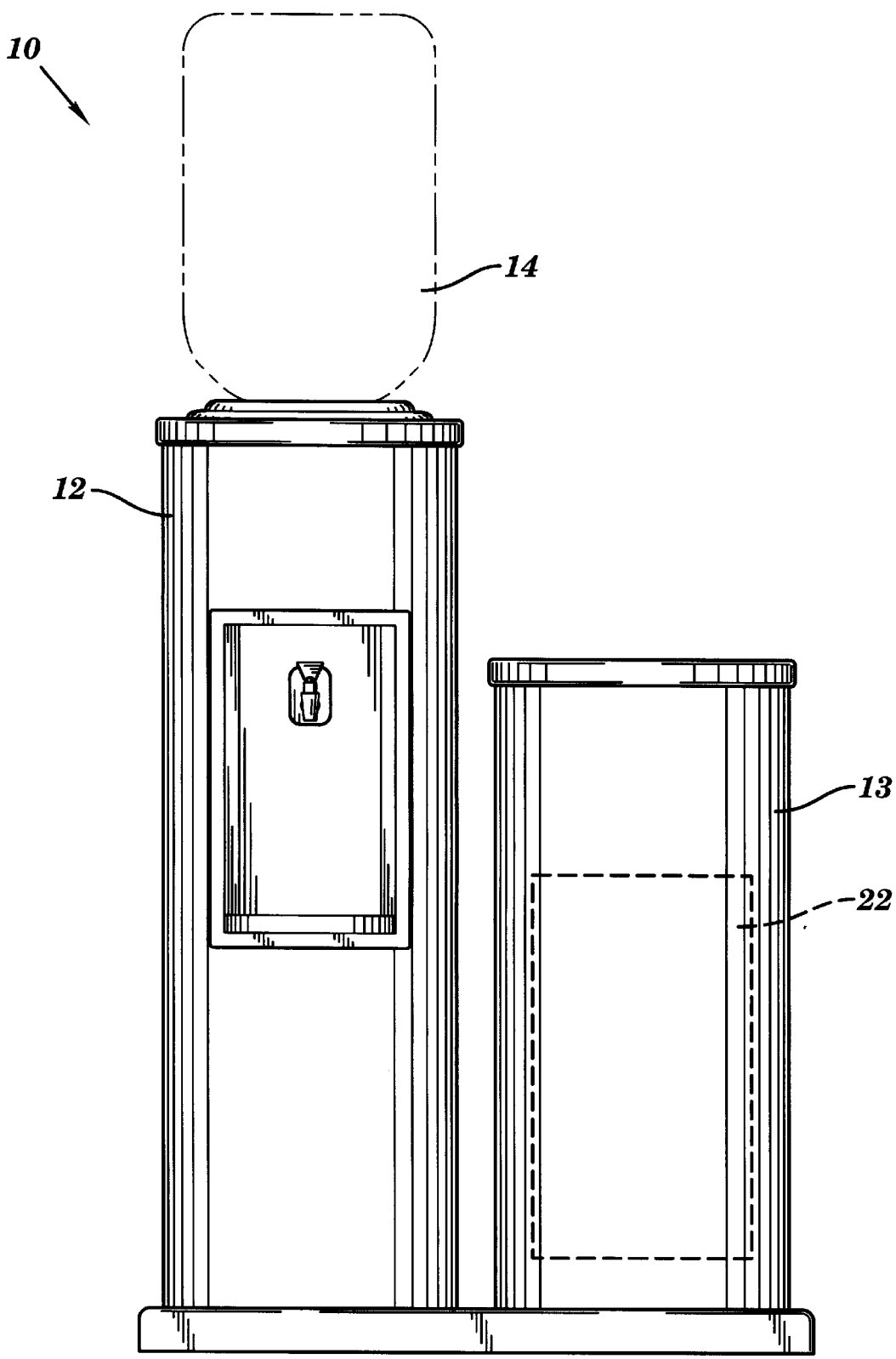
FIG. 8 illustrates an oxygenated water cooler in accordance with an alternate embodiment of the present invention.

The oxygen source 22 is in the form of a compact oxygen supply installed in the water cooler fiberglass enclosure 12 or within a separate housing 13 as shown in FIG. 8. The oxygen source 22 may comprise a pressurized oxygen storage cylinder or an oxygen generator which produces high purity oxygen from room air. In either case, the oxygen is preferably delivered to the water tank 16 at a regulated pressure of 1–2 PSIG. The oxygen generator may be a single sieve bed pressure swing absorption (PSA) system with a capacity of 0.5–1.0 liters per minute. This method of oxygen generation is well established for large scale industrial application. However, the small scale system required for this application is of special design to minimize space requirements, power consumption, and overall cost of the unit. One advantage of the oxygen generator over the storage cylinder approach is the elimination of the need for replacement of empty oxygen cylinders.

The water tank 16 may be equipped with a refrigeration system 18 for maintaining the water dispensing temperature at or below about 50 F. The refrigeration system 18 may comprise a refrigerant compressor, condenser, and cooling coil, a thermoelectric device, or other refrigeration system. The water bottle 14 typically is 5 gallons in size and may be fabricated of either glass, a plastic resin (e.g., polycarbonate), or other suitable material. Regardless of material, the bottle dimensions are generally similar.

Thus, the present invention integrates an oxygen source into a water cooler to maintain previously oxygenated water in bulk water bottles (e.g., 3–5 gallon) in a supersaturated state. The supersaturated state is maintained by controlling the oxygen concentration in the bottle headspace at elevated levels throughout the usage cycle of the water bottle.

Figure 4:
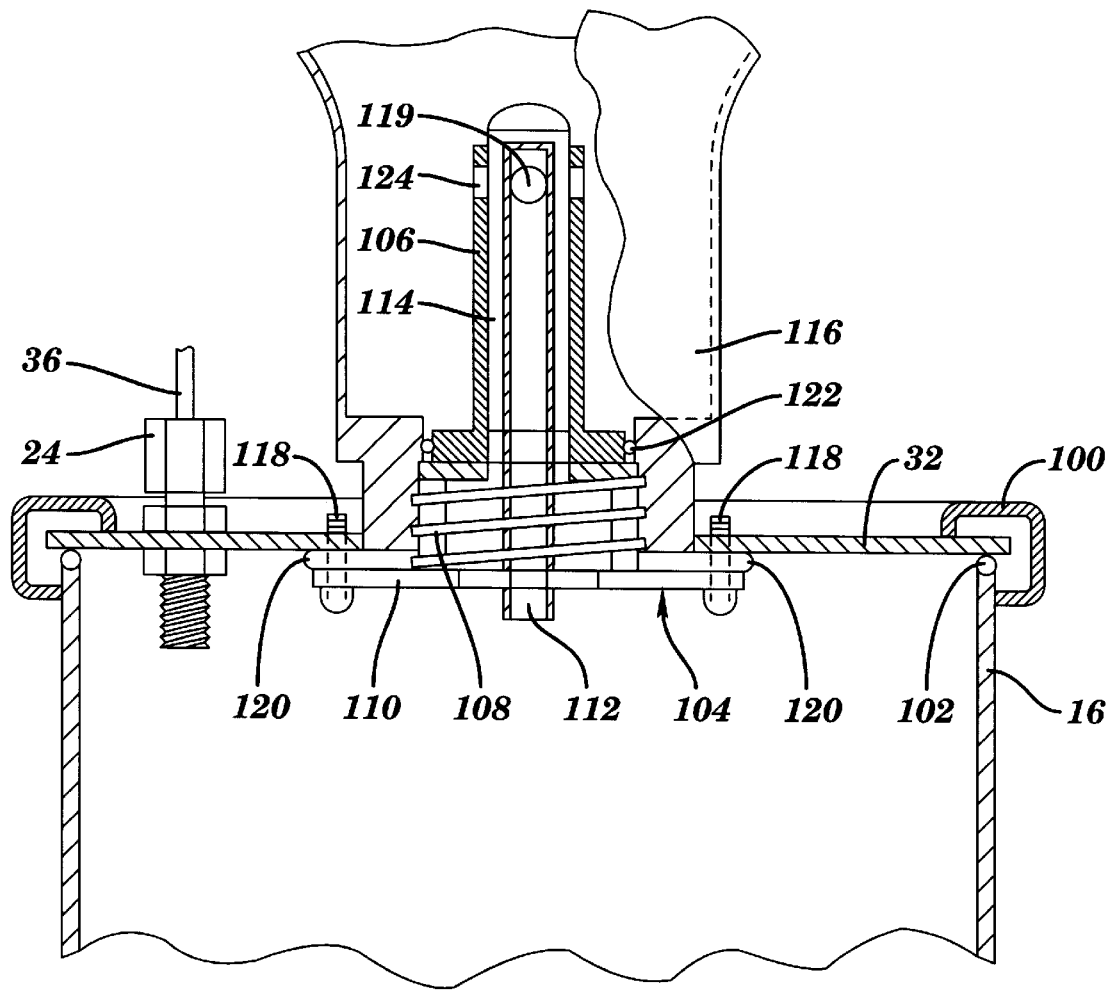
FIG. 4 is a partial cross-sectional view of a water tank lid assembly according to the present invention.

FIG. 4 is a partial cross-sectional view of a water tank lid assembly in accordance with the present invention. A food grade gasket 102 seals the water tank lid 32 to the top of the water tank 16. The water tank lid 32 is firmly fixed to the water tank 16 using four locking clamps 100.

A mounting adapter assembly 104 includes a feed probe 106, a threaded fastener 108, a liquid conduit 112, an oxygen conduit 114, and a mounting flange 110. The central, upwardly projecting feed probe 106 enters an opening in the cap of a water bottle (not shown) in a manner known in the art. An inverted water bottle (see, e.g., FIG. 1) is supported in a bottle entry portion 116. When in this position, water flows from the water bottle through the cap into a port 119 formed in the feed probe 106. After entering the port 119, the water flows downward through the liquid conduit 112 and enters into the water tank 16. At the same time, to replace the volume of water leaving the water tank 16, an equivalent volume of make-up oxygen in the water tank 16 flows up through the oxygen conduit 114 and enters the water bottle through the oxygen port 124. Oxygen flows from an oxygen source through the conduit 36 into the water tank 16. The conduit 36 is attached to the water tank lid 32 by the tubing connection 24.

The mounting adapter assembly 104 is attached to the bottle entry portion 116 by the threaded fastener 108. Other types of fastening systems may also be used. A flexible circular seal 122 is located between the bottle entry portion 116 and the mounting adapter assembly 104. The circular seal 122 prevents oxygen from leaking from the water tank 16 through the threaded fastener 108 into the bottle entry portion 116.

The mounting adapter assembly 104 includes a flange 110 that is attached by threaded fasteners 118 or other suitable hardware to the water tank lid 32. In order to provide a strong rigid support for the weight of the water bottle 14, both the water tank lid 32 and the flange 110 are preferably formed of a strong, rustproof material such as stainless steel. A suitable flexible sealing material 120, such as silicone rubber or the like, is applied to the surface between the flange 110 and the water tank lid 32. The flexible sealing material 120 is provided to prevent oxygen or water from escaping from the water tank 16.

The preferred form of the oxygen source 22 is an oxygen generator in the form of a pressure swing adsorption apparatus. The pressure swing adsorption process is well known and, briefly, is a separation process used to extract oxygen from ambient or room air. The extraction is accomplished by injecting a stream of compressed air into a tank that is filled with a material called a molecular sieve. This sieve is an inert ceramic material in bead form that is designed to adsorb nitrogen more quickly than oxygen. As pressure builds in the sieve tank, nitrogen molecules attach themselves to the sieve while oxygen molecules pass through as the product gas. The product oxygen is then directed to a small storage tank where it is held until needed. The stored oxygen is generally available at pressures of up to about 2 PSIG and flow rates of about 0.5 to 1.0 liters per minute.

Eventually, the sieve tank becomes saturated with nitrogen molecules and needs to be regenerated. This is done by venting the pressure in the sieve tank to the atmosphere. The nitrogen molecules previously attached to the sieve are released and within a few seconds the sieve bed is ready to begin accepting the feed air supply and producing oxygen again. The oxygen and air flows through the generator are controlled automatically by electrically operated solenoid valves. The valve cycle times are preset at electronic timers.

Figure 2:
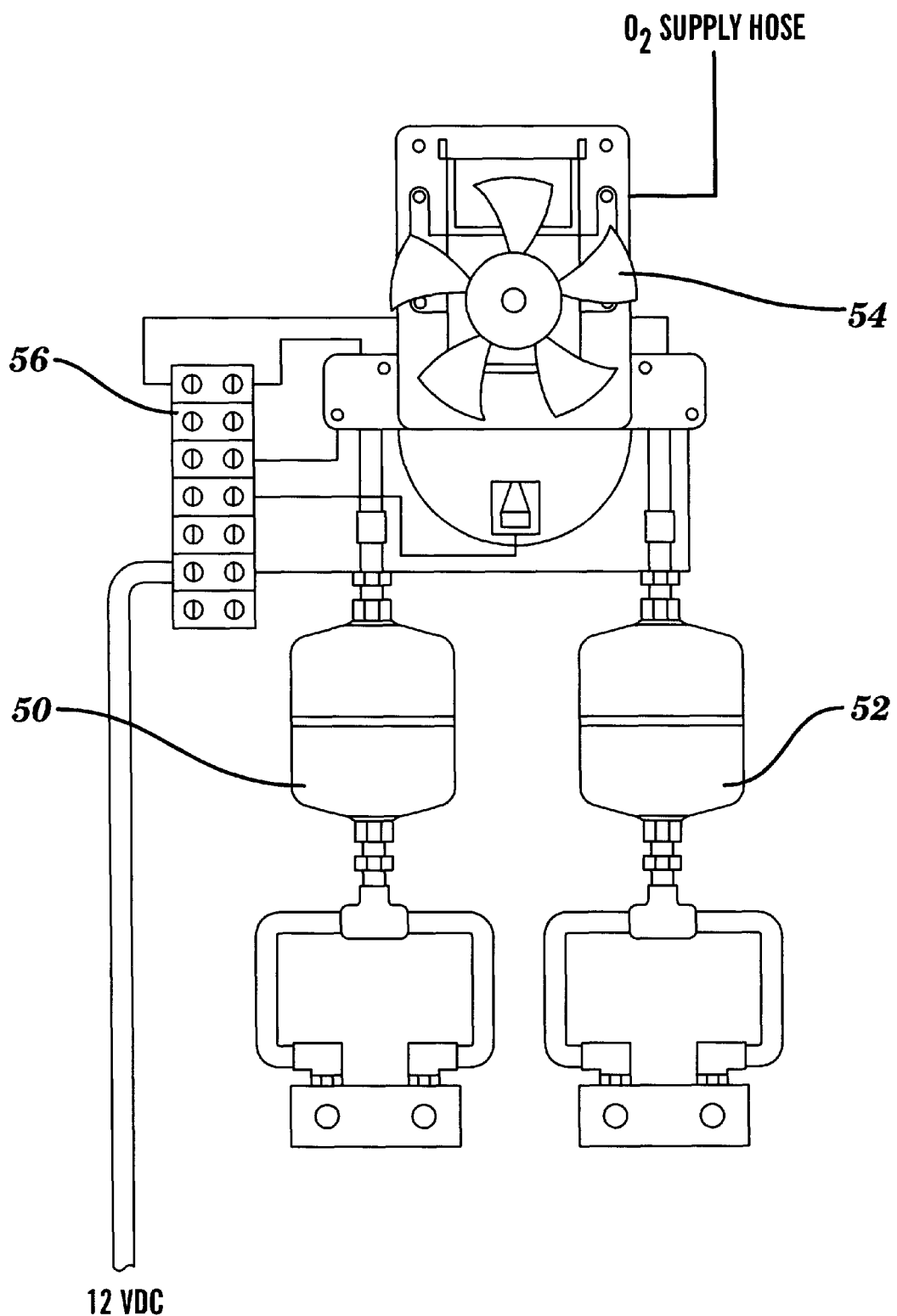
FIG. 2 is an elevational view further illustrating the oxygen generator in the water cooler of FIG. 1.

The oxygen generator illustrated in FIG. 1 includes an air compressor 40, valves, timing circuits, tanks 42 and 44, pressure gauges, and all other required piping components to be considered a completely self contained oxygen generating system. The oxygen generator additionally includes a sieve venting port 304 for venting the tanks 42 and 44 during regeneration, and an outlet conduit 148 for releasing the vented nitrogen to the atmosphere. FIG. 2 illustrates a miniaturized version having approximate dimensions of 14 inches in height, 6.5 inches in width and 8.0 inches in depth. The miniaturized version includes tanks 50 and 52, compressor 54 and control 56.

Figure 3:
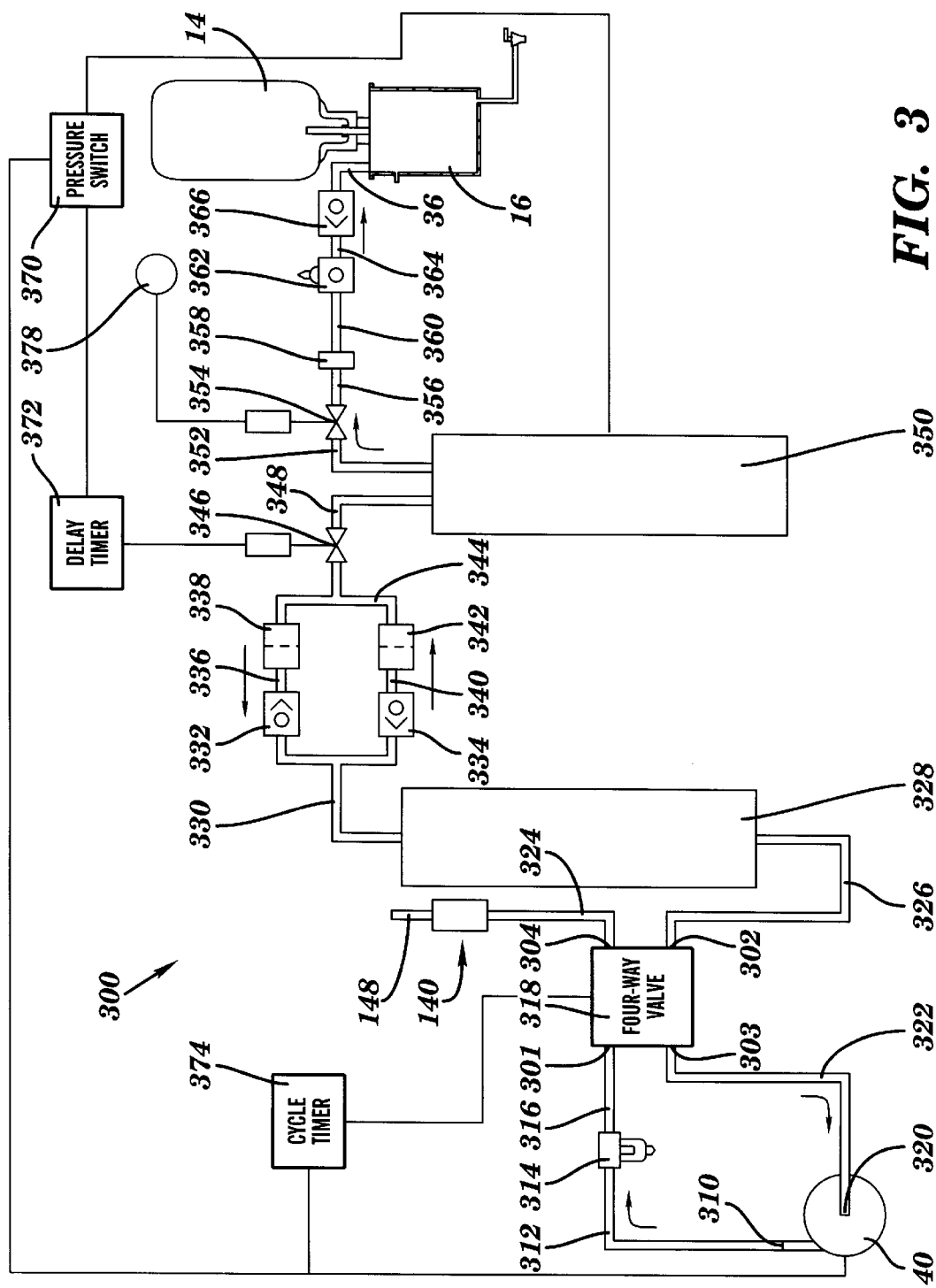
FIG. 3 is a diagrammatic view of a control circuit for providing increased purity levels of oxygen according to the present invention.

FIG. 3 shows a diagrammatic view of a control system 300 for providing improved oxygen purity levels within the water bottle 14. The outlet 310 of the air compressor 40 is connected by a conduit 312 to an air filter 314. The air filter 314 is connected by a conduit 316 to a port 301 of a four-way valve 318. Port 303 of the four-way valve 318 is connected by a conduit 322 to an inlet 320 of the air compressor 40. Port 304 of the four-way valve 318 is connected by a conduit 324 to a muffler apparatus 140 which includes an outlet tube 148. Port 302 of the four-way valve 318 is connected by a conduit 326 to a sieve bed 328.

The sieve bed 328 is connected by a conduit 330 to check valves 332 and 334. A conduit 336 connects the check valve 332 with a flow restrictor 338. The flow restrictor 338 includes an orifice with a hole diameter of about 0.010 inches. A conduit 340 connects the check valve 334 to a flow restrictor 342. Flow restrictor 342 includes an orifice with a hole diameter of about 0.016 inches. A conduit 344 connects flow restrictors 338 and 342 to a control valve 346. Conduit 348 connects the control valve 346 to an oxygen tank 350. Conduit 352 connects the oxygen tank 350 to a control valve 354, and a conduit 356 connects the control valve 354 with a bacteria filter 358. The bacteria filter 358 filters any bacteria in the oxygen before the oxygen reaches the water bottle 14, to prevent bacterial growth in the water bottle 14. A conduit 360 connects the bacteria filter 358 with a pressure relief valve 362. The pressure relief valve 362 ensures that pressures will remain at safe levels inside the water tank 16. A conduit 364 connects the pressure relief valve 362 with a check valve 366, and conduit 36 connects the check valve 366 and the water tank 16. The check valve 366 allows oxygen to enter the water tank 16 and prevents oxygen from leaving the water tank 16. The control valves 346, 354 may be implemented using solenoid controlled valves or other suitable control valves.

The control system 300 also includes a pressure switch 370, a delay timer 372, and a cycle timer 374. There are two control valves 346 and 354. Control valve 354 is opened whenever power 378 is applied to the control system 300. With control valve 354 opened, oxygen can flow from the oxygen tank 350 to the water tank 16. When the pressure switch 370 detects about a 2 psi drop in the oxygen tank 350, the pressure switch 370 closes and provides power to the delay timer 372 and the cycle timer 374, and the compressor 40 is turned on. At this time, the delay timer 372 initiates a count to delay the opening of the control valve 346 for about one minute, thus temporarily preventing any gas flow from the sieve bed 328 to the oxygen tank 350. During this one minute time period, the sieve bed 328 is purged and cycled until high purity oxygen is obtained.

It was discovered that low oxygen purity was obtained during initial purge cycles of the sieve bed 328. Therefore, a method was developed to ensure that gas from the sieve bed 328 would not be allowed to flow to the oxygen tank 350 until a high purity of oxygen was obtained.

The purge cycling of the sieve bed 328 is controlled by the cycle timer 374. In an exhaust cycle, the cycle timer 374 controls the four-way valve 318, such that for a predetermined period of time, ports 301 and 304 are connected, and simultaneously ports 302 and 303 are connected. In a pressure cycle, the cycle timer 374 controls the four-way valve 318, such that for a predetermined period of time, ports 301 and 302 are connected, and simultaneously ports 303 and 304 are connected. In a preferred embodiment of the present invention, the exhaust cycle last about 10 seconds, while the pressure cycle lasts about 21 seconds. It should be clear, however, that the specific time periods of the exhaust and pressure cycles may vary according to the size and type of sieve bed 328, the flow requirements of the system, as well as other factors.

During the pressure cycle, air enters the outlet conduit 148, flows to compressor 40 where the air is pressurized, and flows to the sieve bed 328. The oxygen produced using the sieve bed 328 flows from the sieve bed 328 through the check valve 334 and the restrictor 342. If the valve 346 is open, the oxygen will then flow to the oxygen tank 350. The restrictor 342 causes an optimum flow rate through the sieve bed 328 to produce oxygen with high purity. If the valve 346 is closed, the sieve bed 328 will be pressurized.

During the exhaust cycle, gas is drawn through the restrictor 338, the check valve 332, the sieve bed 328, the compressor 40, and the muffler apparatus 140, exiting through the outlet tube 148. If the valve 346 is open, the check valve 332 allows oxygen to flow through the restrictor 338 back through the sieve bed 328 in order to purge the sieve bed of nitrogen. The restrictor 338 causes an optimum flow rate through the sieve bed 328 to cause the maximum release of nitrogen from the sieve bed 328.

The cycle timer 374 and the compressor 40 continue to operate until the pressure switch 370 senses a maximum pressure level (about 2 PSIG) in the oxygen tank 350. This causes the pressure switch 370 to open and thereby turns off power to the delay timer 372, the cycle timer 374, and the compressor 40. When the pressure switch 370 again detects about a 2 psi drop in the oxygen tank 350, the purge cycle starts again.

Figure 9:
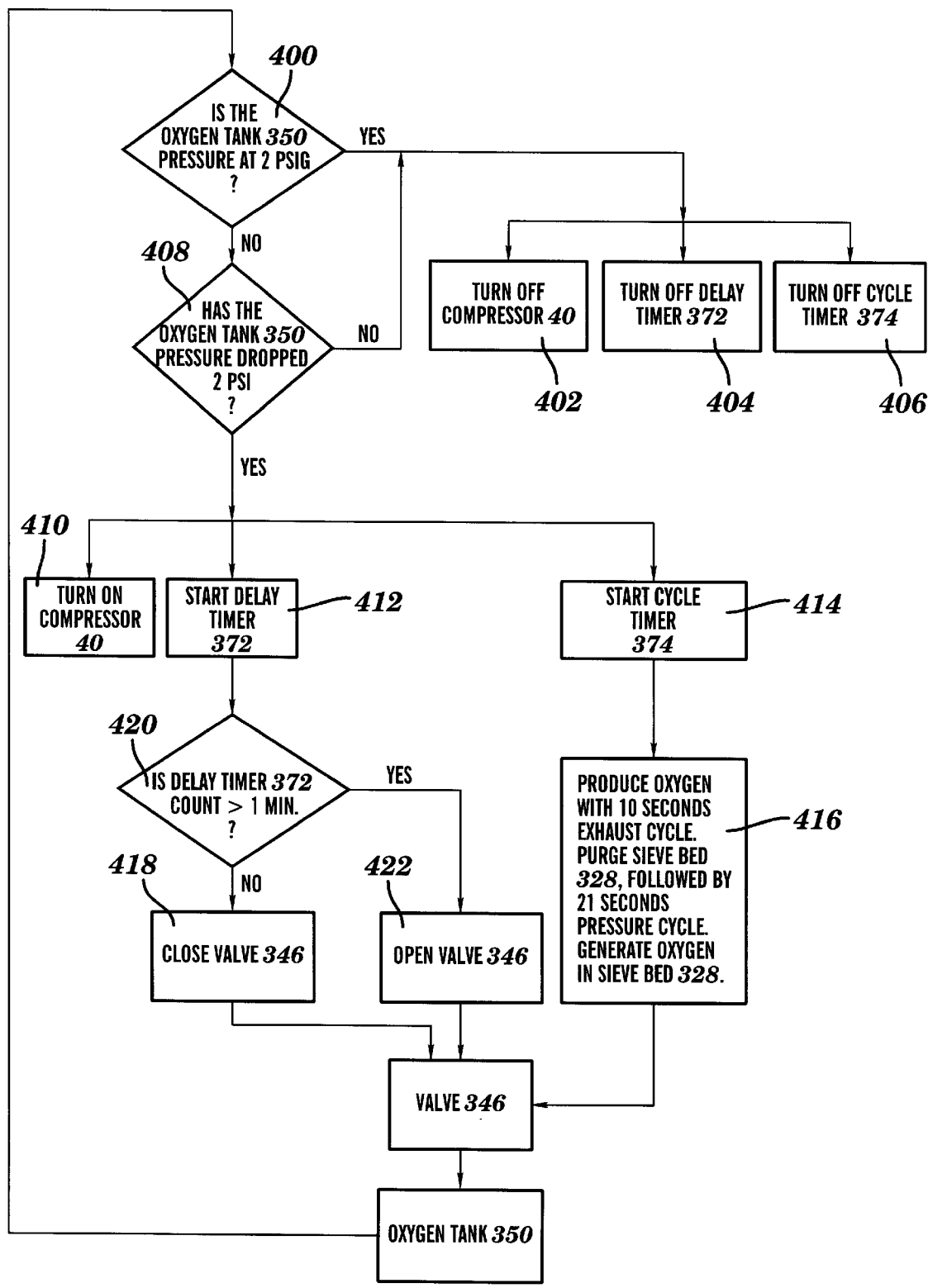
FIG. 9 is a flowchart illustrating the operational flow of the control circuit of FIG. 3.

The general operation of the control system 300 is also illustrated in FIG. 9 in flowchart form. In the following description of FIG. 9, reference will be made to corresponding system elements illustrated in FIG. 3.

In block 400, the pressure switch 370 determines whether the pressure within the oxygen tank 350 is above a predetermined value (e.g., 2 PSIG). If yes, the air compressor 40, delay timer 372, and cycle timer 374 are turned off as indicated in blocks 402, 404, and 406. If no, the pressure switch 370 determines (block 408) whether the pressure within the oxygen tank 350 has decreased more than a predetermined value (e.g., 2 psi). If the pressure has not decreased beyond the predetermined value, the air compressor 40, delay timer 372, and cycle timer 374 are turned off. If the pressure has decreased beyond the predetermined value, the air compressor 40 is turned on (block 410), the delay timer 372 is started (block 412), and the cycle timer 374 is started (block 414).

Upon activation of the cycle timer 374, oxygen is generated in a cyclical manner (block 416), including an exhaust cycle and a pressure cycle, until the oxygen in the oxygen tank 350 reaches the predetermined pressure (block 400). Specifically, during the exhaust cycle, the sieve bed 328 is purged for a predetermined amount of time (e.g., 10 seconds). Thereafter, during the pressure cycle, oxygen is produced in the sieve bed 328 for a predetermined amount of time (e.g., 21 seconds). The exhaust and pressure cycles are continuously repeated until the oxygen in the oxygen tank 350 reaches the predetermined pressure (block 400).

The control valve 346 is maintained in a closed state (block 418) until the delay timer 372 has reached a predetermined value (e.g., 1 minute) (block 420). Advantageously, this prevents the low purity oxygen generated during the initial purge cycles of the sieve bed 328 from entering the oxygen tank 350. After the delay timer 372 has reached the predetermined value, the control valve 346 is opened (block 422), thereby allowing the oxygen generated in block 416 to enter the oxygen tank 350. Oxygen continues to be produced until the oxygen in the oxygen tank 350 reaches the predetermined pressure (block 400).

Figure 5:
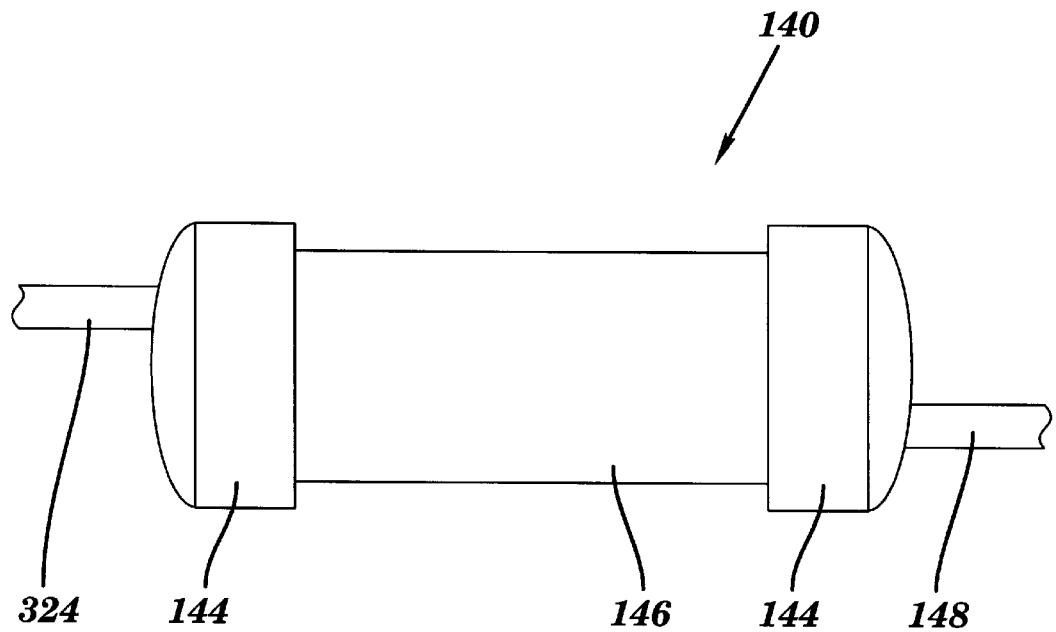
FIG. 5 is a perspective view of a muffler apparatus.

FIG. 5 is a perspective view of a muffler apparatus 140 for use in conjunction with the oxygenated water cooler of the present invention. The muffler apparatus 140 includes an inlet tube 324, end caps 144, a central body 146 and an outlet tube 148. To reduce the noise level generated by the compressor 40 pulsating flow, the muffler apparatus 140 is installed on the conduit 324 as shown in FIG. 3.

Figure 6:
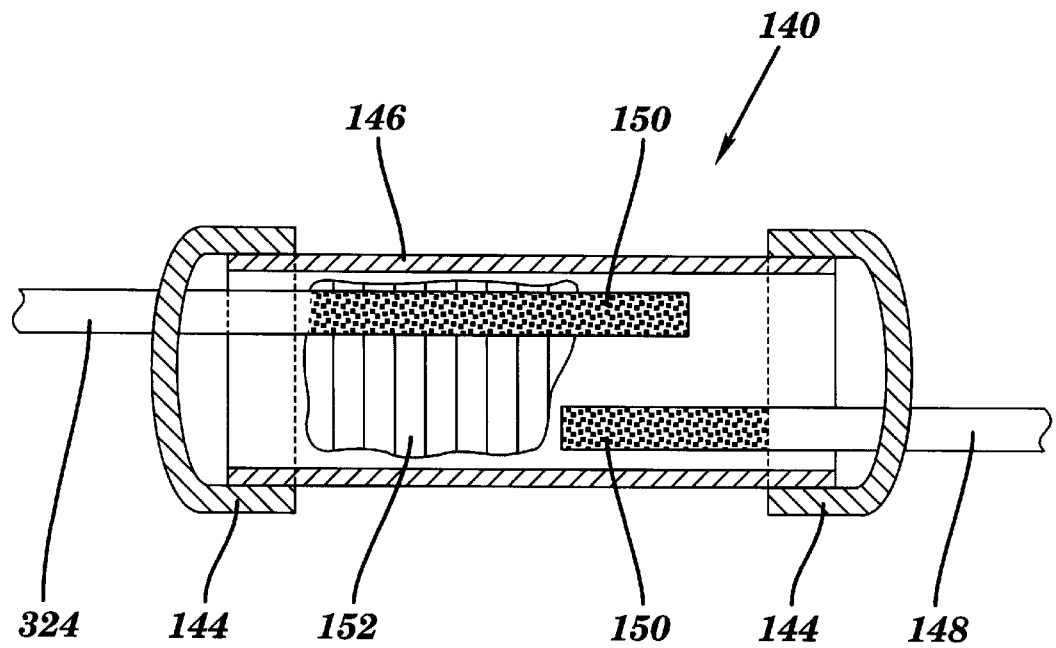
FIG. 6 is a cross-sectional view of the muffler apparatus.

FIG. 6 is a longitudinal cross-sectional view of the muffler apparatus 140. As illustrated in FIG. 6, the inlet tube 324 and the outlet tube 148 extend through the end caps 144 into a region inside the central body 146, and are perforated with a plurality of small holes 150. The plurality of small holes 150 dissipate the energy of the high frequency noise components emanating from the compressor 40. Also, the interior of the central body 146 is filled with a multicelled flexible noise absorption material 152 to further reduce and dampen the lower frequency noise components emanating from the compressor 40. Thus the muffler apparatus 140 provides compressor 40, noise reduction to a quiet room acceptable level.

Figure 7:
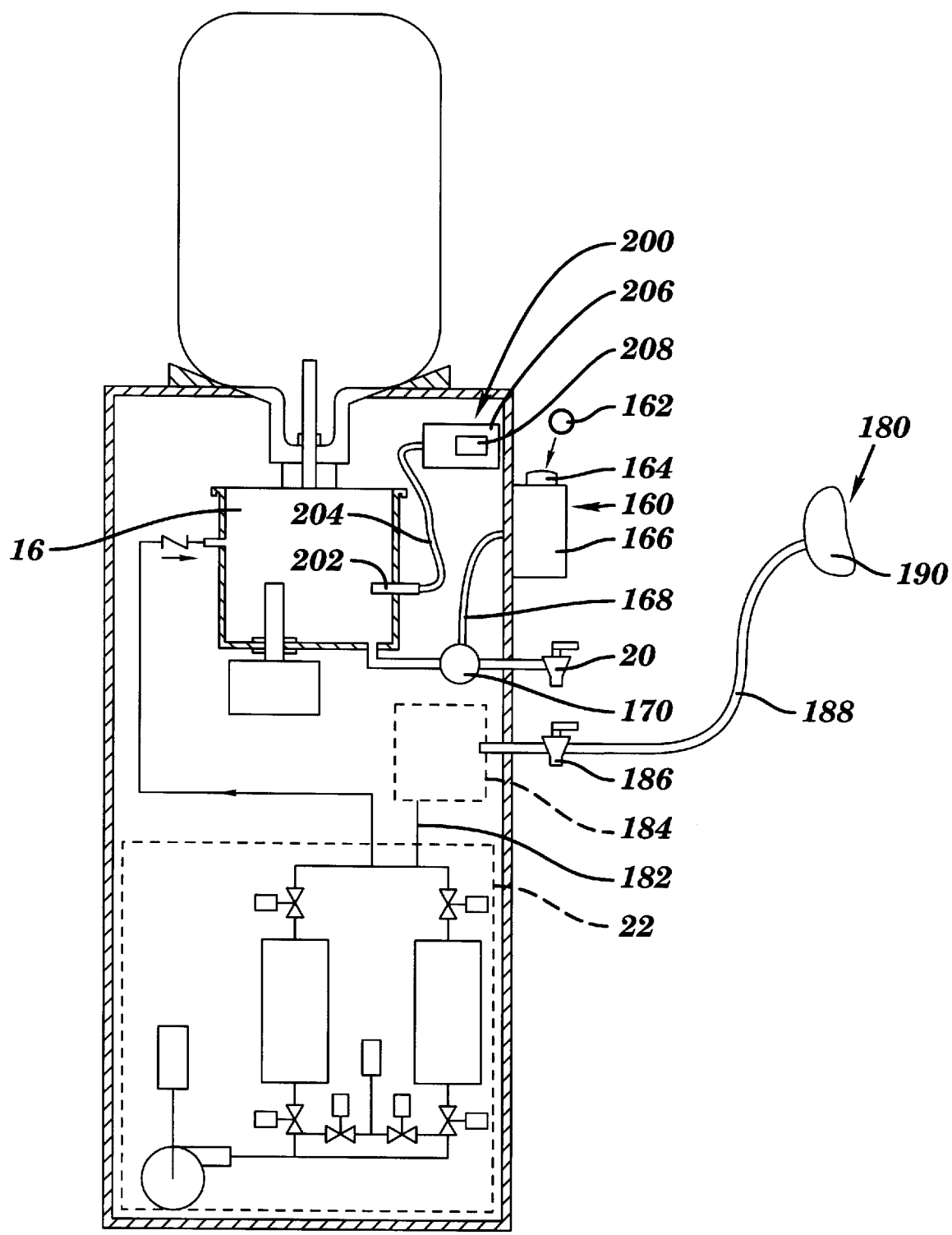
FIG. 7 is a diagrammatic view of an oxygenated water cooler in accordance with the present invention including a water dispenser control unit, an oxygen breathing system, and an oxygen level measurement system.

FIG. 7 is a diagrammatic view of an oxygenated water cooler in accordance with the present invention which includes a coin operated control unit 160, an oxygen breathing system 180, and an oxygen level measuring system 200. The coin operated control unit 160 includes a coin collection and metering box 164, a control unit 166, wiring 168, and a water control valve 170. When a coin 162 is inserted into the coin operated control unit 160, the control unit 166 is actuated and provides a metering cycle to the water control valve 170 to dispense a predetermined quantity of water through the spigot 20. The control unit 166 is connected to the water control valve 170 with the wiring 168. Other means of payment, such as bills, tokens, credit cards, ATM or debit cards, or the like, may also or alternately be used to purchase oxygenated water from the oxygenated water cooler. Of course, the type of collection and metering box 164 is dependent upon the type of payment to be used.

As further illustrated in FIG. 7, the oxygen breathing system 180 includes a supply conduit 182, a control system 184, a valve 186, a supply line 188, and a face mask 190. The supply conduit 182 carries oxygen from the oxygen source 22 to the control system 184. Pressure and flow regulation and oxygen filtration are provided within the control system 184. A supply line 188 carries oxygen from the control unit 184 to the face mask 190 in response to the actuation of the valve 186. Alternately, a currency operated control unit and control valve, such as control unit 160 and valve 170, may be used to dispense metered amounts of oxygen to the face mask 190 in response to receipt of payment.

The oxygen level measuring system 200 is also illustrated in FIG. 7. As shown, the oxygen level measuring system 200 includes an oxygen level sensor 202, a sensor signal cable 204, a signal processing unit 206, and a meter display 208. The oxygen level sensor 202 samples the oxygen level in the oxygenated water in the water tank 16 and sends sampling information through the sensor signal cable 204 to the signal processing unit 206. The signal processing unit 206 processes the information from the oxygen level sensor 202 and displays the results on the meter display 208. Preferably, a reading of the percentage of oxygen in the oxygenated water compared to the level in water that has not been oxygenated is displayed on the meter display 208.

The present invention is illustrated further by the following data. Table I includes test data that indicates the decay rate of oxygen saturation level in water bottles installed on water coolers that are not provided with an oxygen source. Dissolved oxygen concentration was measured using an Orion Model 830 portable dissolved oxygen meter.

TABLE I

Rate of Dissolved Oxygen Concentration
Decline in Oxygenated Water
Standard Water Cooler With No Oxygen Source,
5 Gallon Glass Bottle

| Sample Date | Mg/Liter Dissolved Oxygen |
| --- | --- |
| 2-5-97 | 27.3 |
| 2-6-97 | 24.2 |
| 2-7-97 | 18.3 |
| 2-8-97 | 12.7 |
| 2-7-97 | 65.2 |
| 2-8-97 | 20.8 |
| 2-10-97 | 12.2 |
| 2-11-97 | 11.0 |
| 2-12-97 | 10.9 |

Table II includes data for water bottles installed on an oxygenated water cooler according to the present invention. The oxygen source used was bottled oxygen regulated to a pressure of 2 PSIG. Dissolved oxygen concentration was measured using an Orion Model 830 portable dissolved oxygen meter.

TABLE II

Rate of Dissolved Oxygen Concentration Decline in
Oxygenated Water

| Sample Date | Mg/Liter Dissolved Oxygen |
| --- | --- |
| Oxygenated Water Cooler With Oxygen Source, 3 Gallon Plastic Bottle | |
| 1-31-97 AM | 46.5 |
| 1-31-97 PM | 43.7 |
| 2-1-97 | 42.6 |
| 2-3-97 | 50.0 |
| 2-4-97 | 45.2 |
| 2-5-97 | 40.8 |
| 2-6-97 | 38.9 |
| 2-7-97 | 38.8 |
| 2-8-97 | 40.2 |
| 2-10-97 | 41.3 |
| Oxygenated Water Cooler With Oxygen Source, 5 Gallon Glass Bottle | |
| 2-10-97 | 60.0 |
| 2-11-97 | 50.5 |
| 2-12-97 | 50.6 |
| 2-13-97 | 49.9 |
| 2-14-97 | 49.2 |
| 2-15-97 | 50.1 |
| 2-17-97 | 50.8 |
| 2-18-97 | 48.0 |
| 2-19-97 | 49.5 |
| 2-20-97 | 48.0 |

The foregoing data clearly shows that previously oxygenated water that is dispensed from a water cooler according to the present invention equipped with an oxygen source that maintains the bottle headspace at a minimum of 90% pure oxygen will maintain a supersaturated state (greater than 20 mg/liter dissolved oxygen) for the entire usage cycle (which is approximately ten days). Previously oxygenated water that is dispensed from a water cooler that is not equipped with an oxygen source to control headspace oxygen levels does not maintain the supersaturated state at the water cooler for more than 5 days. Therefore, standard, prior art water coolers without an oxygen source do not effectively deliver superoxygenated water at consistent dissolved oxygen levels throughout the 10–14 day usage cycle of a 5 gallon bottle. This data demonstrates the advantages and characterizing features of the present invention.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

What is claimed is:

1. A water cooler comprising:
   a water tank for receiving water from a bottle containing water having a dissolved oxygen content at a supersaturated level;
   a system for dispensing water from the water tank;
   a refrigeration source for cooling water in the water tank;
   an oxygen source; and
   a system for introducing oxygen from the oxygen source through the water in the water tank to a headspace above the water in the bottle to maintain the dissolved oxygen content of the water in the bottle substantially at the supersaturated level throughout the usage cycle of the bottle.

2. The water cooler according to claim 1, wherein the water tank further includes a water tank lid for supporting the bottle and for sealing water and oxygen in the water tank.

3. The water cooler according to claim 2, wherein the water tank further includes a mounting adapter assembly for mounting the bottle above the water tank in an inverted position.

4. The water cooler according to claim 3, wherein the mounting adapter assembly further includes:
   a mounting flange for supporting the bottle;
   a system for attaching the mounting flange to a lid of the water tank;
   a seal for sealing the mounting flange against the water tank lid to prevent oxygen from leaking from the water tank; and
   a feed probe extending through the mounting flange for transferring water from the bottle to the water tank, and for transferring oxygen from a headspace of the oxygen tank to the water bottle.

5. The water cooler according to claim 1, further including a control unit for accepting a payment and for dispensing a predetermined quantity of water from the water cooler through the dispensing system in response to the payment.

6. The water cooler according to claim 1, further including a system for providing gaseous oxygen to a user for direct inhalation.

7. The water cooler according to claim 6, wherein the oxygen providing system further includes a face mask.

8. The water cooler according to claim 6, wherein the gaseous oxygen is provided by the oxygen source.

9. The water cooler according to claim 1, wherein the oxygen source comprises bottled oxygen.

10. The water cooler according to claim 1, wherein the oxygen source comprises an oxygen generator.

11. The water cooler according to claim 1, wherein the oxygen source comprises a pressure swing adsorption oxygen generating apparatus.

12. The water cooler according to claim 1, further including a muffler for reducing noise generated through an exhaust port of the oxygen source.

13. The water cooler according to claim 12, wherein the muffler comprises:
  a body containing a sound reducing material;
  an inlet tube, connected to the exhaust port of the oxygen source, extending into the body; and
  an outlet tube connected to the body;
  wherein the inlet and outlet tubes include a plurality of openings positioned within the body.

14. The water cooler according to claim 1, further including an apparatus for measuring the dissolved oxygen content of the water in the water cooler.

15. The water cooler according to claim 14, wherein the oxygen measuring apparatus further includes a system for displaying a value corresponding to the measured dissolved oxygen content of the water in the water cooler.

16. The water cooler according to claim 15, wherein the displayed value corresponds to a ratio of the measured dissolved oxygen content of the water in the water cooler to a dissolved oxygen content of nonoxygenated water.

17. The water cooler according to claim 1, wherein the oxygen source comprises:
  a compressor for producing a compressed stream of air;
  a sieve bed for separating oxygen from the compressed stream of air;
  an oxygen tank for storing oxygen produced by the sieve bed; and
  a control system for controlling the operation of the oxygen source.

18. The water cooler according to claim 17, wherein the control system is configured to cyclically purge the sieve bed of nitrogen.

19. The water cooler according to claim 17, wherein the control system is configured to control the operation of the oxygen source to cyclically produce oxygen and purge the sieve bed of nitrogen for a predetermined period of time prior to delivering oxygen to the oxygen tank.

20. The water cooler according to claim 17, wherein the control system further includes a pressure switch for actuating the production of oxygen by the oxygen source in response to a predetermined reduction of pressure within the oxygen tank.

21. An apparatus comprising:
  a water bottle containing water having a dissolved oxygen content at a supersaturated level;
  a system for dispensing water from the water bottle; and
  a system for introducing oxygen to a headspace above the water in the water bottle as water is dispensed by the dispensing system to maintain the dissolved oxygen content of the water in the water bottle substantially at the supersaturated level.

22. The apparatus according to claim 21, wherein the dispensing system comprises a water cooler.

23. The apparatus according to claim 21, wherein the system for introducing oxygen includes an oxygen generator for suppling the oxygen.

24. The apparatus according to claim 21, wherein the system for introducing oxygen includes bottled oxygen for supplying the oxygen.

* * * * *